(12) United States Patent
Jiang

(10) Patent No.: US 10,204,150 B2
(45) Date of Patent: Feb. 12, 2019

(54) SIMPLIFIED HIERARCHY DEFINITION FOR MULTIDIMENSIONAL DATA ANALYSIS

(71) Applicant: Shan Jiang, Saratoga, CA (US)

(72) Inventor: Shan Jiang, Saratoga, CA (US)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 14/222,239

(22) Filed: Mar. 21, 2014

(65) Prior Publication Data

US 2015/0269254 A1 Sep. 24, 2015

(51) Int. Cl.
*G06F 17/30* (2006.01)

(52) U.S. Cl.
CPC .. *G06F 17/30598* (2013.01); *G06F 17/30592* (2013.01)

(58) Field of Classification Search
CPC ......... G06F 17/30722; G06F 17/30643; G06F 17/30598; G06F 17/30572; G06F 17/30587; G06F 17/30589; G06F 17/30592
USPC .......................................................... 707/740
See application file for complete search history.

(56) References Cited

U.S. PATENT DOCUMENTS

| | | | | |
|---|---|---|---|---|
| 5,918,232 A * | 6/1999 | Pouschine | ......... | G06F 17/30592 |
| 6,301,579 B1 * | 10/2001 | Becker | .............. | G06F 17/30592 |
| 6,356,900 B1 * | 3/2002 | Egilsson | ........... | G06F 17/30392 |
| 6,684,207 B1 * | 1/2004 | Greenfield | .......... | G06F 17/3041 |
| 7,505,888 B2 * | 3/2009 | Legault | ............. | G06F 17/30554 |
| | | | | 703/22 |
| 2002/0091681 A1 * | 7/2002 | Cras | ................... | G06F 17/30392 |
| 2002/0133368 A1 * | 9/2002 | Strutt | ................ | G06F 17/30592 |
| | | | | 705/7.11 |
| 2003/0144868 A1 * | 7/2003 | MacIntyre | ........ | G06F 17/30536 |
| | | | | 705/7.38 |
| 2004/0122844 A1 * | 6/2004 | Malloy | ............. | G06F 17/30592 |
| 2004/0193633 A1 * | 9/2004 | Petculescu | ........ | G06F 17/30592 |
| 2005/0076036 A1 * | 4/2005 | Le | ..................... | G06F 17/30592 |
| 2006/0116859 A1 * | 6/2006 | Legault | ............. | G06F 17/30554 |
| | | | | 703/22 |
| 2007/0027904 A1 * | 2/2007 | Chow | ............... | G06F 17/30427 |
| 2007/0239508 A1 * | 10/2007 | Fazal | ................. | G06Q 10/0637 |
| | | | | 705/7.36 |
| 2010/0274756 A1 * | 10/2010 | Inokuchi | ........... | G06F 17/30592 |
| | | | | 707/602 |
| 2013/0339291 A1 * | 12/2013 | Hasner | .............. | G06F 17/30592 |
| | | | | 707/601 |

OTHER PUBLICATIONS

SAP AG, "SAP BusinessObjects Analysis, edition for OLAP User Guide", SAP Business Objects 4.0 Feature Pack 3, Mar. 16, 2012, 202 pages.*

* cited by examiner

*Primary Examiner* — Tony Mahmoudi
*Assistant Examiner* — Michael Le
(74) *Attorney, Agent, or Firm* — Fountainhead Law Group P.C.

(57) ABSTRACT

Techniques are described for allowing a user to define hierarchical relationships for a multidimensional data model without assistance from a data administrator. The hierarchical relationships can be stored as on the client device as part of report metadata so that they are customizable by the client. A graphical user interface is also described for generating reports using a reporting tool. Through move and select operations, a report along with its underlying hierarchical relationships can be customized by the client.

17 Claims, 10 Drawing Sheets

125 ⟶

Hierarchy Table

| Axis | Position | Level | Variable Name | Hierarchy |
|---|---|---|---|---|
| 0 | 0 | 0 | Revenue | |
| 1 | 0 | 0 | Region | |
| 1 | 0 | 1 | State | |
| 1 | 1 | 0 | Product | X |

300 ⟶

⟵ Level 0

⟵ Level 1

⟵ Level 2

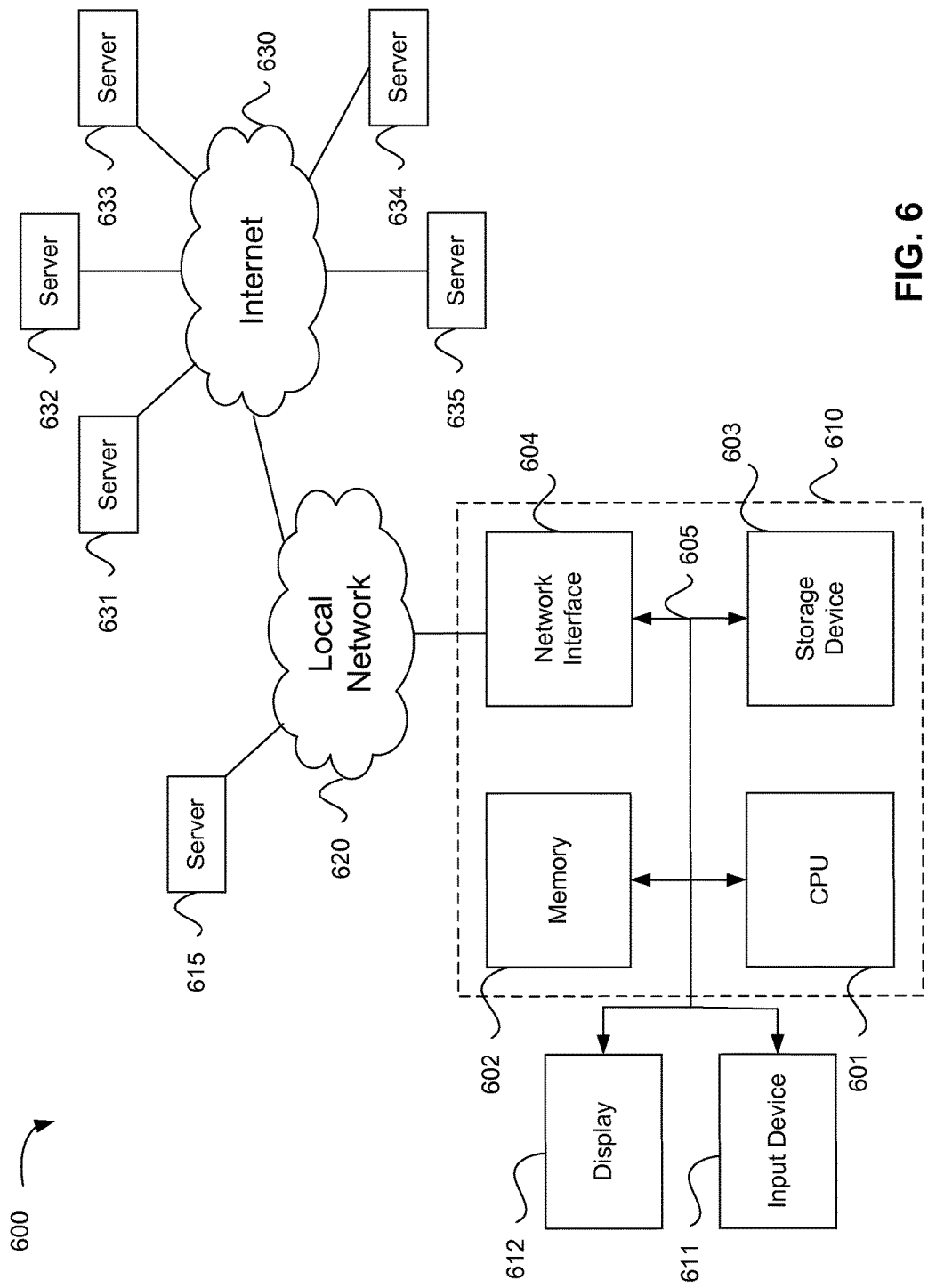

SIMPLIFIED HIERARCHY DEFINITION FOR MULTIDIMENSIONAL DATA ANALYSIS

BACKGROUND

In today's business environment, more data is being generated than ever before. As a result, business intelligence software is often relied upon to generate useful analysis from complex, multidimensional data models. Business intelligence software can aggregate data from the data models and present the aggregated results to the consumer for analysis in the form of a report or a dashboard containing multiple reports. In many cases, the type of data aggregation that can be performed by the business intelligence software is configured by data administrators of the organization. The ordinary consumer who primary reads the reports and dashboards that are prepared by the business intelligent software does not have the skill set or necessary permissions to configure the business intelligence software. Often times, different consumers may desire a different navigation path or data aggregation than what is available in the present configuration of the business intelligence software. As a result, the data administrator can receive many requests from various consumers to change the hierarchy definition. Given that there are often many more consumers than data administrators in an organization, these requests can become a major bottleneck.

SUMMARY

In one embodiment, a computer-implemented method provides, by a processor, a first window configured to present a library containing variables belonging to a multi-dimensional data model. The method then provides, by the processor, a second window configured to present one or more variables from the library that are used in a report on the multidimensional data model, the report having report metadata defining hierarchical relationships between the one or more variables. Upon receiving the entity database, the method then detects, by the processor, a move operation to move a first variable from the first window to the second window. The method then updates, by the processor, the report metadata to include the first variable in response to detecting the move operation.

In one example, the updating the report metadata further includes updating the report metadata comprises establishing, by the processor, a hierarchical relationship between the first variable and a second variable in the report metadata when the first variable is moved to a location in the second window that overlaps the second variable. Establishing the hierarchical relationship can include determining, by the processor, that the multidimensional data model includes a relationship between the first variable and the second variable and setting, by the processor, the hierarchical relationship based on the relationship In another example, the method further includes providing, by the processor, a chart of the report that corresponds with the second variable in a third window, detecting, by the processor, a selection of a chart element within the chart that corresponds to a value of the second variable, identifying, by the processor, the first variable as a child to the second variable based on the report metadata, and replacing, by the processor, the chart with another chart that corresponds with the first variable filtered according to the value of the second variable.

In another example, the method further includes updating, by the processor, the dimension library in the first window to display only variables which can establish a hierarchical relationship within the report metadata.

In another example, the first variable includes a predefined hierarchy with a third variable and wherein the report metadata tracks the predefined hierarchy.

In another embodiment, a non-transitory computer readable storage medium stores one or more programs comprising instructions for providing a first window configured to present a library containing variables belonging to a multi-dimensional data model. The one or more programs further include instructions for providing a second window configured to present one or more variables from the library that are used in a report on the multidimensional data model, the report having report metadata defining hierarchical relationships between the one or more variables. The one or more programs further include instructions for detecting a move operation to move a first variable from the first window to the second window. The one or more programs further include instructions for updating the report metadata to include the first variable in response to detecting the move operation.

In another embodiment, a computer implemented system comprises one or more computer processors and a non-transitory computer-readable storage medium. The non-transitory computer-readable storage medium comprises instructions, that when executed, control the one or more computer processors to be configured for providing a first window configured to present a library containing variables belonging to a multidimensional data model, providing a second window configured to present one or more variables from the library that are used in a report on the multidimensional data model, the report having report metadata defining hierarchical relationships between the one or more variables, detecting a move operation to move a first variable from the first window to the second window, and updating the report metadata to include the first variable in response to detecting the move operation.

The following detailed description and accompanying drawings provide a better understanding of the nature and advantages of the present disclosure.

BRIEF DESCRIPTION OF THE DRAWINGS

FIG. 6 illustrates an exemplary computer system according to one embodiment.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Disclosed herein are techniques that allow a user to define hierarchical relationships for a multidimensional data model without the assistance of data administrators. A multidimensional data model can be composed of measures and dimensions. A measure stores facts collected from business operations. Measures are organized by dimensions, which are essentially variables in the data model. The multidimensional data model can also store hierarchical relationships and levels between dimensions or measures. The hierarchical relationships and levels describe how data is organized and thus aggregated in the data model. Furthermore, the hierarchical relationships and levels can describe how a user can navigate to different aggregated data in the report. For example, a hierarchical relationship can specify that a state dimension is a child of a region dimension. By defining the hierarchical relationship, the server can aggregate the data first by region, followed by each state within a given region. This allows a user in an organization who is interested in a particular region to navigate to that region, and discover how each state within that region performed. Since data aggregation is dependent on the hierarchical definitions, it follows that the analysis that can be performed on the data model depends on the hierarchies defined.

The hierarchical relationships can be defined on the client side, thus allowing each user to define their own unique hierarchy definition (versus the traditional means where users share the same hierarchy definition defined by the data administrator). This allows each user to customize the way data is aggregated in a report on the data model. In some embodiments, the hierarchy definitions can be edited while using a reporting tool on the client side that is configured to build and consume the reports. These techniques are described in further detail below.

Figure 1:
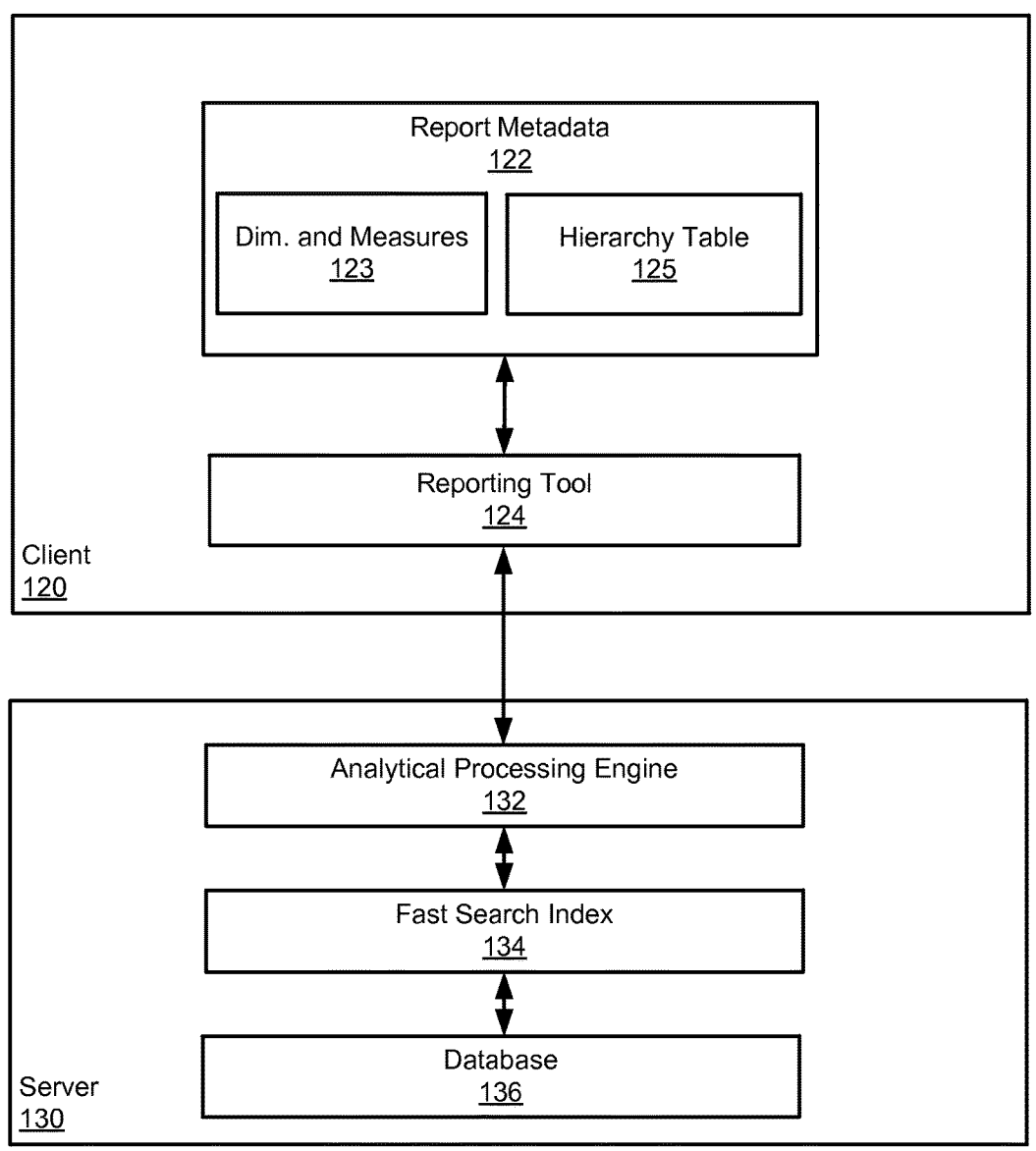
FIG. 1 illustrates a system according to one embodiment.

FIG. 1 illustrates a system according to one embodiment. System 100 is configured to generate and consume reports. System 100 includes client 120 that is in communication with server 130. Generally, a consumer can utilize client 120 to both generate and consume a report that is based on a data model. The report contains analysis, which includes aggregated content from the data model. Reporting tool 124 on client 120 can be an application on client 120 that can generate reports. Reporting tool 124 can also present the content of a received report on a graphical user interface for consumption by the consumer.

Client 120 further includes report metadata 122. Report metadata 122 stores information for configuring a report. This can include setting up the parameters of the report or setting up the hierarchical relationships of the report. In some embodiments, each report on client 120 can include corresponding report metadata. As shown here, report metadata 122 includes dimensions and measures 123. Dimensions and measure 123 is a collection of the dimensions and measures that are available on the data model. For example, a data model can have a list of dimensions. Dimensions are attributes which are being measured in the database. Exemplary dimensions include country of origin, product category, pages, etc. The values for dimensions are typically non-numerical in nature. Measures are the quantities being measured in the database. Exemplary measures include visits, page views, hits, bounce rate, and other items that can be quantified numerically. In a traditional spreadsheet, the dimensions are the rows in the spreadsheet and the measures are the columns. As described here, dimensions and measures are both variables of the data model. Advantages of storing the dimensions and measures 123 on client 120 is that they can be accessed by reporting tool 124 as the report is being generated.

Report metadata 122 further include hierarchy table 125. Hierarchy table 125 stores the hierarchy information for a report. The hierarchy information can define the hierarchical relationships between different variables in the report. For example, hierarchy table 125 can define that a state variable (e.g., CA, TX, NY, etc.) is a child of a region variable (e.g., USA, CAN, JPN, etc.). As described above, modifying the hierarchical relationships in hierarchy table 125 can also alter the type of data aggregation that is being performed for the report. Thus, the advantages of storing hierarchy table 125 on client 120 as opposed to server 130 is that each client can modify the hierarchical relationships between variables in a report without affecting the other clients. Reporting tool 124 can transmit queries to server 130 to request aggregated data for a report. In some examples, the query can be transmitted using a query expression that contains a set of instructions for data which client 120 would like to receive from server 130.

Server 130 includes analytical processing engine 132. Analytical processing engine 132 is configured to receive a query expression from client 120 and to process the query. Analytical processing engine 132 can transmits requests to fast search index 134 which in turn searches for data in database 136. The results of the search are returned from fast search index 134 to analytical processing engine 132 where the results are processed before being returned to client 120.

Figures 2, 3:
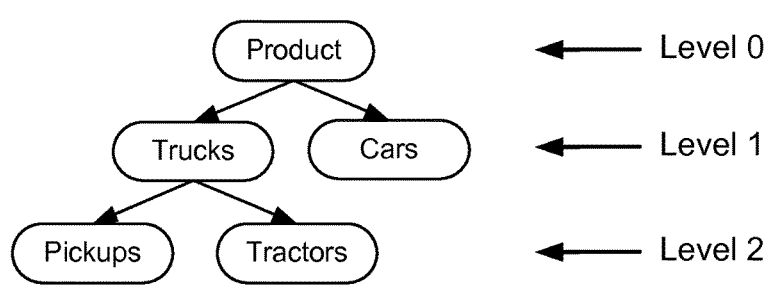
FIG. 2 illustrates a hierarchy table according to one embodiment.
FIG. 3 illustrates a predefined hierarchy according to one embodiment.

FIG. 2 illustrates hierarchy table 125 according to one embodiment. As shown here, hierarchy table 125 is a standard table organized in columns and rows. Hierarchy table 125 stores information to define the variables being included in a report and any hierarchical relationships between the variables. In one embodiment, reporting tool 124 updates hierarchy table 125 when variables are added or removed from the report. In another embodiment, reporting tool 124 queries hierarchy table 125 when processing requests to navigate through the report.

In this embodiment, hierarchy table 125 is a table having five columns and four rows. Each row represents a variable in the report. The first column is the axis column. The axis column defines whether the variable is a dimension or a measure. Variables that are a measure are assigned a value of 0 while variables that are a dimension are assigned a value of 1. The second column is the position column. The position column defines the position of the variable as it appears in the report. Variables having the same axis and position are variables which are related to one another by a parent-child relationship. The third column is the level column. The level column defines the parent-child relationship when one exists. The fourth column is the variable name column which defines the name of the variable. The fifth and final column is the hierarchy column. Setting a flag in this column implies that the variable includes a predefined hierarchy that is defined in the data model. The client can query the server for the predefined hierarchy.

Here, the first variable is named "revenue" and is a measure (axis value is 0). The revenue variable is the only measure being presented in the report (since all the other variables have an axis value of 1, thus implying that they are dimensions). The second variable is named "region" and is a dimension (axis value is 1). The region variable is in position 0 and level 0. Thus, the region is the top level dimension in position 0. The third variable is named "state" and is also a dimension (axis value is 1). Like the region variable, the state variable is also in position 0. However, the state variable has a level of 1. Since both the region variable and the state variable have the same position, a hierarchical relationship between the two variables is defined. The hierarchical relationship can affect how a user navigates through the report. Navigating through a report is described in further detail in FIGS. 4 and 5.

The fourth variable is named "product" and is a dimension (axis value is 1). The product variable is in position 1 and a level 0. The product variable is in a different position then the region variable and the state variable, thus implying that the product variable does not share the same hierarchy as the region variable and the state variable. Product variable has the hierarchy flag set which means that the product variable has a predefined hierarchy that is defined on the data model.

FIG. 3 illustrates a predefined hierarchy according to one embodiment. Predefined hierarchy 300 includes six variables. The predefined hierarchy can be belong to the product variable described in FIG. 2. Here, product variable is at the highest level (level 0). The product variable has hierarchical relationship with trucks variable and cars variable as is shown by the arrows going from product variable to trucks variable and cars variable. Both trucks variable and cars variable reside in level 1 of the predefined hierarchy, which is the level below level 0. As a result, drilling down on product will result in trucks variable and cars variable being presented. Trucks variable has a hierarchical relationship with pickups variable and tractors variable, again shown by the arrows. Drilling down on trucks variable from level 1 results in the presentation of pickups variable and tractors variable in level 2. As shown here, each variable can have a one to many relationship (product variable to trucks variable and cars variable). Furthermore, the predefined hierarchy can have multiple levels of hierarchy.

Figure 4A:
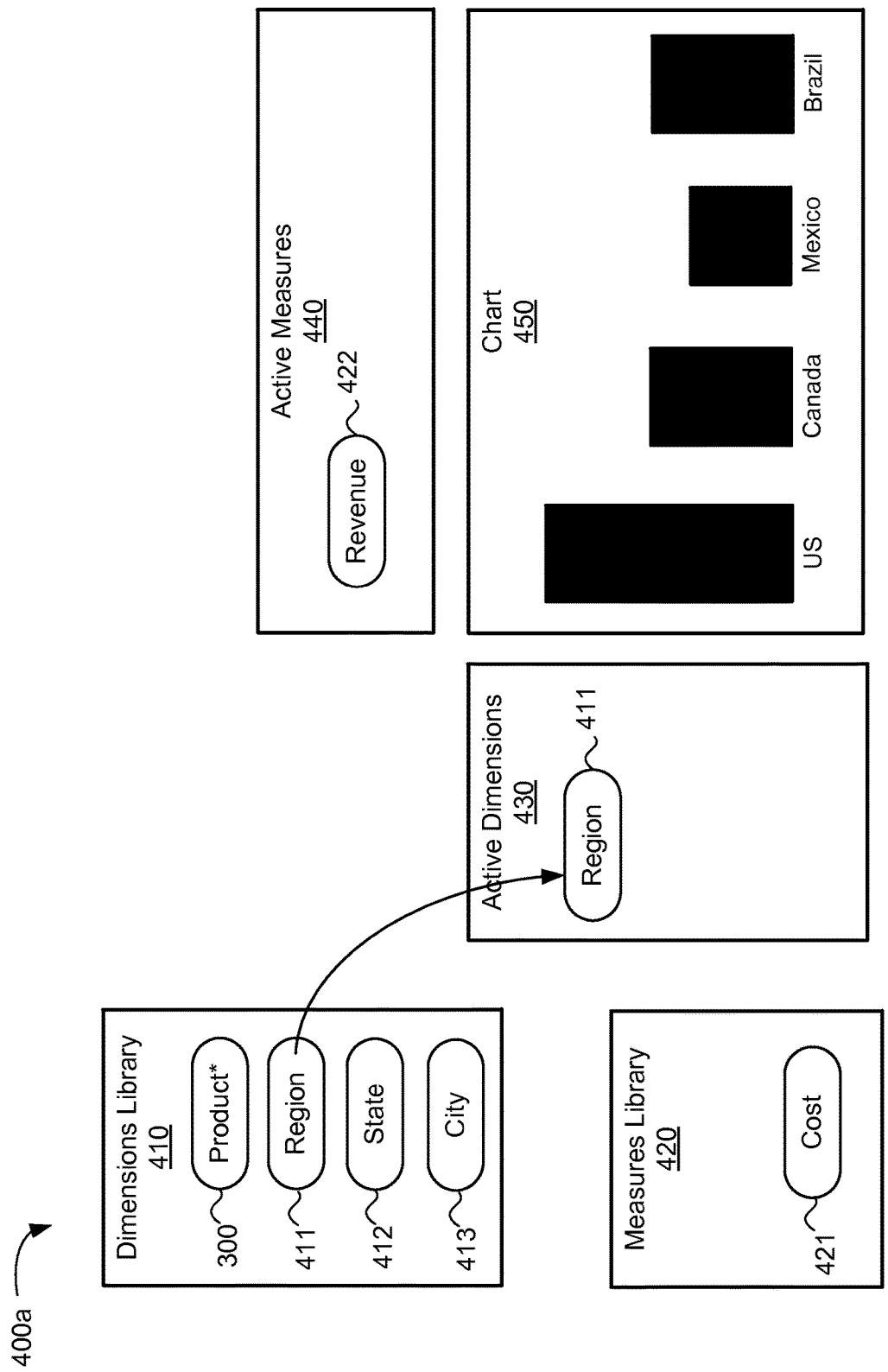
FIGS. 4*a-f* illustrate screenshots of a reporting tool according to one embodiment.

FIG. 4a illustrates a screenshot of a reporting tool according to one embodiment. As shown, screenshot 400a presents a graphical user interface that includes multiple windows each configured to present details on the report. Dimensions library 410 is a window configured to list the available dimensions from the data model. In one embodiment, each dimension presented in dimensions library 410 can be added to the report. Here, dimensions library 410 includes product 300, region 411, state 412, and city 413. Product 300 includes an asterisk to identify the dimension as having a predefined hierarchy. In other examples, other types of modifiers such as changes to the color or shape of a dimension can be applied to product 300 to distinguish dimensions with a predefined hierarchy from other dimensions.

Active dimensions 430 is configured to list the dimensions which have been added to the report. A user can add a dimension to the report by moving the desired dimension from dimensions library 410 to active dimensions 430. When the graphical user interface of reporting tool 124 detects a move operation to move a dimension from dimensions library 410 to active dimensions 430, reporting tool 124 process the move operation resulting in the moved dimension appearing in active dimensions 430. In some examples, the processing can include updating report metadata 122 in response to dimensions that have been added to the report. The move operation can be a tap and drag motion on a touch screen interface, a click and drag motion using a peripheral device such as a mouse, or other predefined operation performed by the user. Here, a move operation to move region 411 from dimensions library 410 to active dimensions 430 is detected.

Similar to the dimensions, measures library 420 is configured to list the measures that are available from the data model and active measures 440 is configured to list the measures which have been added to the report. In one embodiment, measures library 420 can only list the measures that can be added to the report. Reporting tool 124 can update report metadata 122, measures library 420, and active measures 440 in response to a move operation to add a measure to the report. The report metadata 122 can be modified to include the added measure, measures library 420 can be updated to only display the measures that can currently be added to the report, and active measures 440 can be updated to include the moved measure.

In some embodiments, reporting tool 124 can automatically generate chart 450 in response to the adding region 411 to the report (or adding a measure to the report). Chart 450 presents the revenue in the different regions. To generate chart 450, reporting tool 124 can query to server 130 to aggregate the data to be presented in chart 450. Once the data is received, reporting tool 124 can generate chart 450.

Figure 4B:
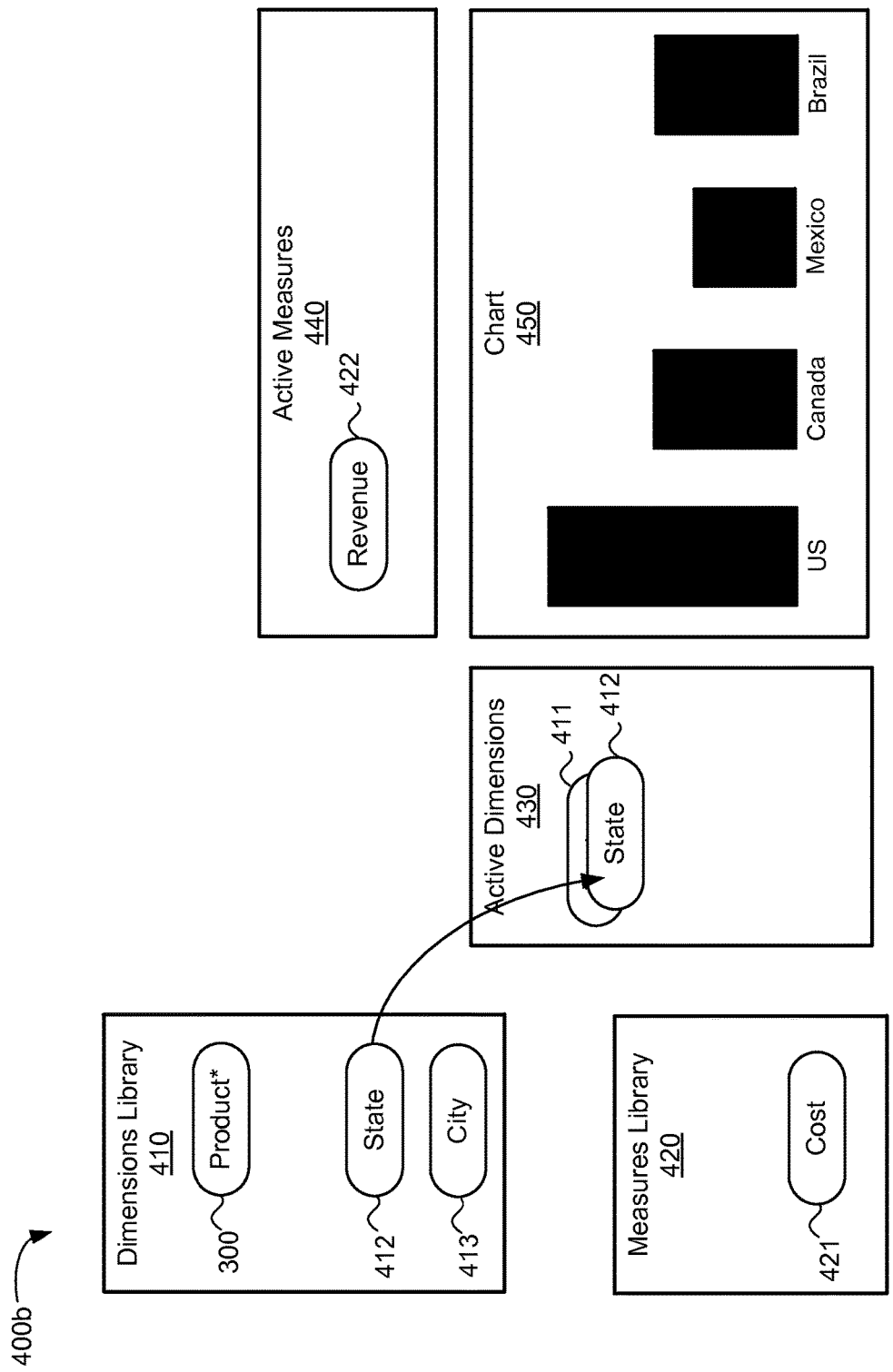

FIG. 4b illustrates another screenshot of a reporting tool according to one embodiment. In one embodiment, screenshot 400b can be captured after screenshot 400a of FIG. 4a. As shown in screenshot 400b, a second move operation is being performed to move state 412 from dimensions library 410 to active dimensions 430. This is after a first move operation to move region 411 to active dimensions 430. The second move operation can move state 412 from dimensions library 410 to a location in active dimensions 430 which overlaps region 411. In some embodiments, reporting tool 412 can create a hierarchical relationship between two dimensions when reporting tool 412 detects a move operation that moves a first dimension to a location within active dimension 430 that overlaps a portion of a second dimension.

In one embodiment, reporting tool 124 can create a hierarchical relationship between the two variables based on the order in which the variables are moved. For example, reporting tool 124 can create a hierarchical relationship where the moved variable causing the overlap is the child in a parent child relationship. In another embodiment, reporting tool 123 can create a hierarchical relationship between the two variables based on the relationship of the two variables in the data model. For example, let's assume a data model includes a region dimension that aggregates data by region (US, CAN, JPN, etc.) and a state dimension that aggregates data by the states within a region. The data model can save the region dimension as a parent of the state dimension. When creating the hierarchical relationship, reporting tool 124 can use the hierarchical relationships of the of the data model as a guideline. In one example, reporting tool 124 can copy the hierarchical relationship of the data model. In another example, reporting tool 124 can generate a hierarchical relationship that does not violate (or otherwise conforms) with the hierarchical relationships in the data model. In some examples, reporting tool 412 can update report metadata 122 to include the generated hierarchical relationship Move operations can also remove a dimension from active dimensions 430 or active measures 440. For example, a dimension can be removed from active dimensions 430 by a move operation consisting of selecting and dragging the dimension outside the window of active dimensions 430. When reporting tool 124 detects that a dimension has been removed from active dimensions 430, reporting tool 124 can update hierarchy table 125 of report metadata 122 to remove any hierarchical relationships that rely on the removed dimension. Once the dimension has been removed, reporting tool 124 can update dimensions library 410 to include the removed dimension. In some examples, reporting tool 124 can confirm that the dimension can be added back into the report before adding the dimension to dimensions library 410.

In some embodiments, reporting tool 124 can refresh dimensions library 410 after a move operation to only display dimensions which can be moved to active dimensions 430 through a subsequent move operation. Dimensions that can no longer be moved to active dimensions 430 can be removed from dimensions library 410. In one embodiment, a dimension can no longer be moved to active dimensions 430 if the dimension has previously been moved to active dimensions 430. For instance in screenshot 400b, reporting tool 124 has removed region 411 from dimensions library 410 because region 411 was previously added to active dimensions 430. In another embodiment, a dimension can no longer be moved to active dimensions 430 if adding the dimension to the report would conflict with a preexisting relationship in the data model. For example, let's assume that a data model includes three dimensions—a region dimension (e.g., US, CAN, JPN), a state dimension (e.g., CA, NY, TX), and a city dimension (e.g., San Jose, Santa Clara, Palo Alto). The data model specifies preexisting relationships where region dimensions are connected to state dimensions, which are in turn connected to city dimensions. Each link can be a one-to-many relationship. For instance, a region dimension can be linked to multiple state dimensions and a state dimension can be linked to multiple city dimensions. If the report already has a hierarchical relationship connecting the region dimension to the city dimension, then it may not be possible to add the state dimension to the report since the state dimension can no longer be linked as either a child of the region dimension or a parent of the city dimension. Reporting tool 124 can determine that both of these possibilities have been exhausted due to the defined hierarchical relationship in the report and remove the state dimension from dimensions library 410. This can prevent the violation of existing hierarchical relationships on the report.

Besides move operations, reporting tool 124 can also detect selection operations. A selection operation can be a user selecting a chart element within a chart. The selection can be performed by tapping the chart element on a touch interface, clicking the chart element using a peripheral device such as a mouse, or otherwise selecting the chart element through some form of user interface. Upon detecting the selection of a chart element, reporting tool 124 can "drill down" and present a detailed chart that corresponds with the selected element. Drill down is a navigation technique in which selection of a chart element can automatically display another chart that provides details on the selected chart element. When a request is received to drill down into a chart element, reporting tool 124 can transmit a query to server 130 requesting content on the chart element, retrieve the content, and generate the detailed chart.

Figure 4C:
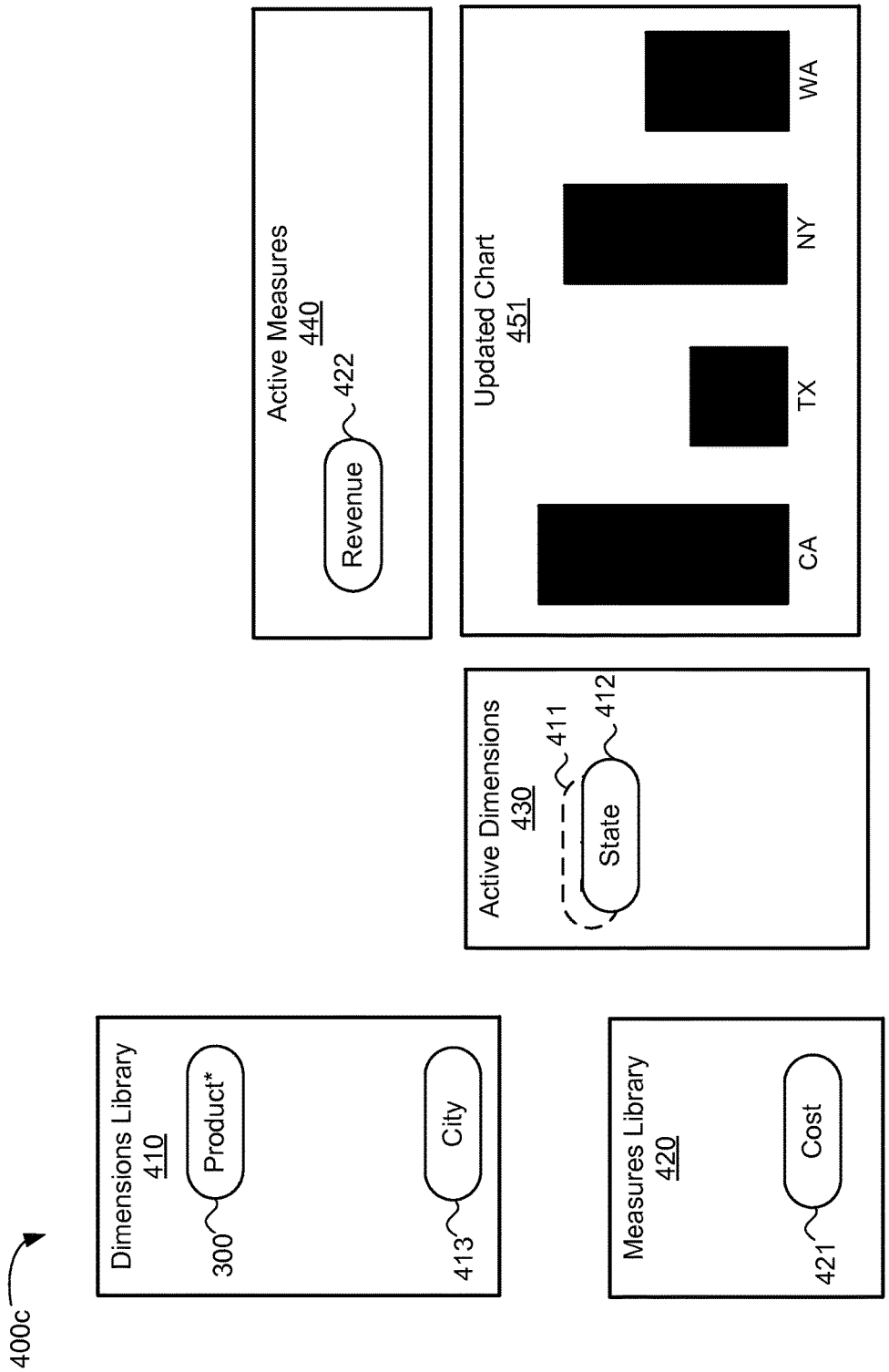

FIG. 4c illustrates another screenshot of a reporting tool according to one embodiment. In one embodiment, screenshot 400c can be captured after screenshot 400b in FIG. 4b. Here in screenshot 400c, reporting tool 124 has detected a select operation on the US chart element in chart 450 of FIG. 4b. Reporting tool 124 can determine that a hierarchical relationship exists in the report linking the region dimension to the state dimension. As a result, reporting tool 124 can transmit a query to server 130 to request the content for the state dimension where the region dimension is set to the value US. When the results are returned from server 130, reporting tool 124 can present the results as updated chart 451. As shown in screenshot 400c, updated chart 451 presents aggregated data for the state dimension where the region dimension is set to US. As such, each bar is representing a US state. In one embodiment, reporting tool 124 can highlight dimensions in active dimensions 430 that are currently being represented in updated chart 451 or highlight dimensions that are not currently being represented in updated chart 451. Here, the dimension that currently is not being represented in updated chart 451 (i.e., region 411) is being shown here with a dotted line.

Figure 4D:
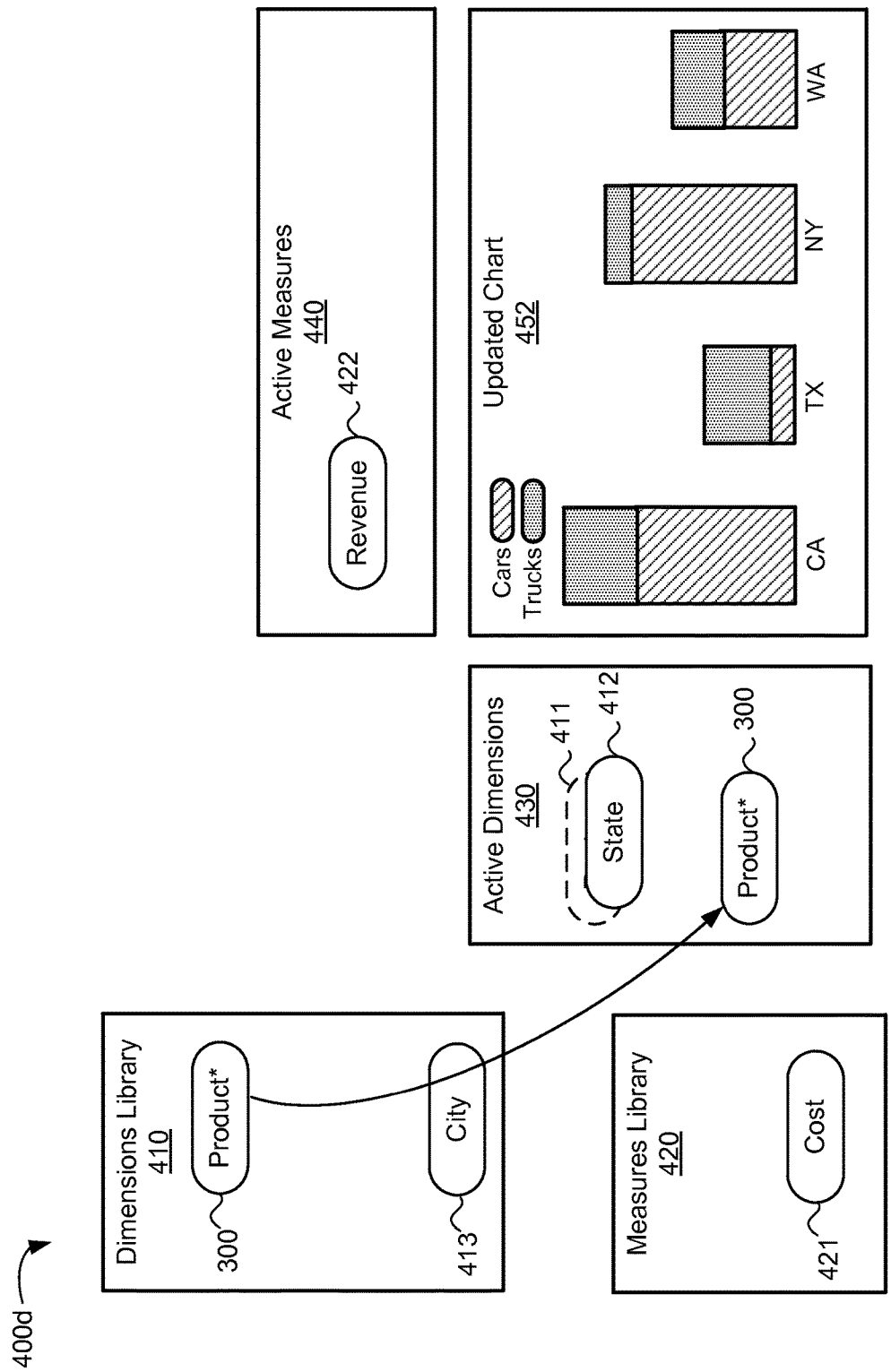

FIG. 4d illustrates another screenshot of a reporting tool according to one embodiment. In one embodiment, screenshot 400d can be captured after screenshot 400c in FIG. 4c. Screenshot 400d illustrates an example of a move operation where a dimension in dimensions library 410 is moved to a location that does not overlap an existing dimension in active dimensions 430. As described above, reporting tool 124 can create a hierarchical relationship between a moved dimension and an existing dimension in active dimensions 430 when the two dimensions overlap. In this embodiment, reporting tool 124 detects a move operation where product 300 is being moved from dimensions library 410 to active dimensions 430. The destination of product 300 is a location in active dimensions 430 that does not overlap existing dimensions region 411 and state 412. Upon determining that the destination of product 300 does not overlap existing dimensions, reporting tool 124 can update hierarchy table 125 to include the moved dimension. In one embodiment, reporting tool 124 can add the moved dimension as a new position in hierarchy table 125. Dimensions having different positions in hierarchy table 125 can be presented simultaneously in a chart. An example of hierarchy table 125 after detecting the move operation to move product 300 to active dimensions 430 is shown in FIG. 2.

In one embodiment, reporting tool 124 can automatically query server 130 for content related to highlighted dimensions and highlighted measures after a move operation. In one embodiment, the query can request for the revenue associated with state 412 when the region 411 is set to US. The query can also request for the revenue for product 300. The results of the query are processed by reporting tool 124 to generate updated chart 452. Processing the retrieved data can include performing data analysis to determine the portion of the revenue that was generated by cars and trucks for each state dimension.

As shown here, updated chart 452 can present content related to the highlighted dimensions in active dimensions 430. With the addition of product 300 (which has a predefined hierarchy) to active dimensions 430, there are two highlighted dimensions—product 300 and state 412. Region 411, which has a hierarchical relationship with state 412, is shown in dotted lines signifying that region 411 is unhighlighted and currently not being represented in updated chart 452. Updated chart 452 displays the aggregated state dimension data where the region is set to US and where the revenue attributed to each product is displayed in the chart.

Figure 4E:
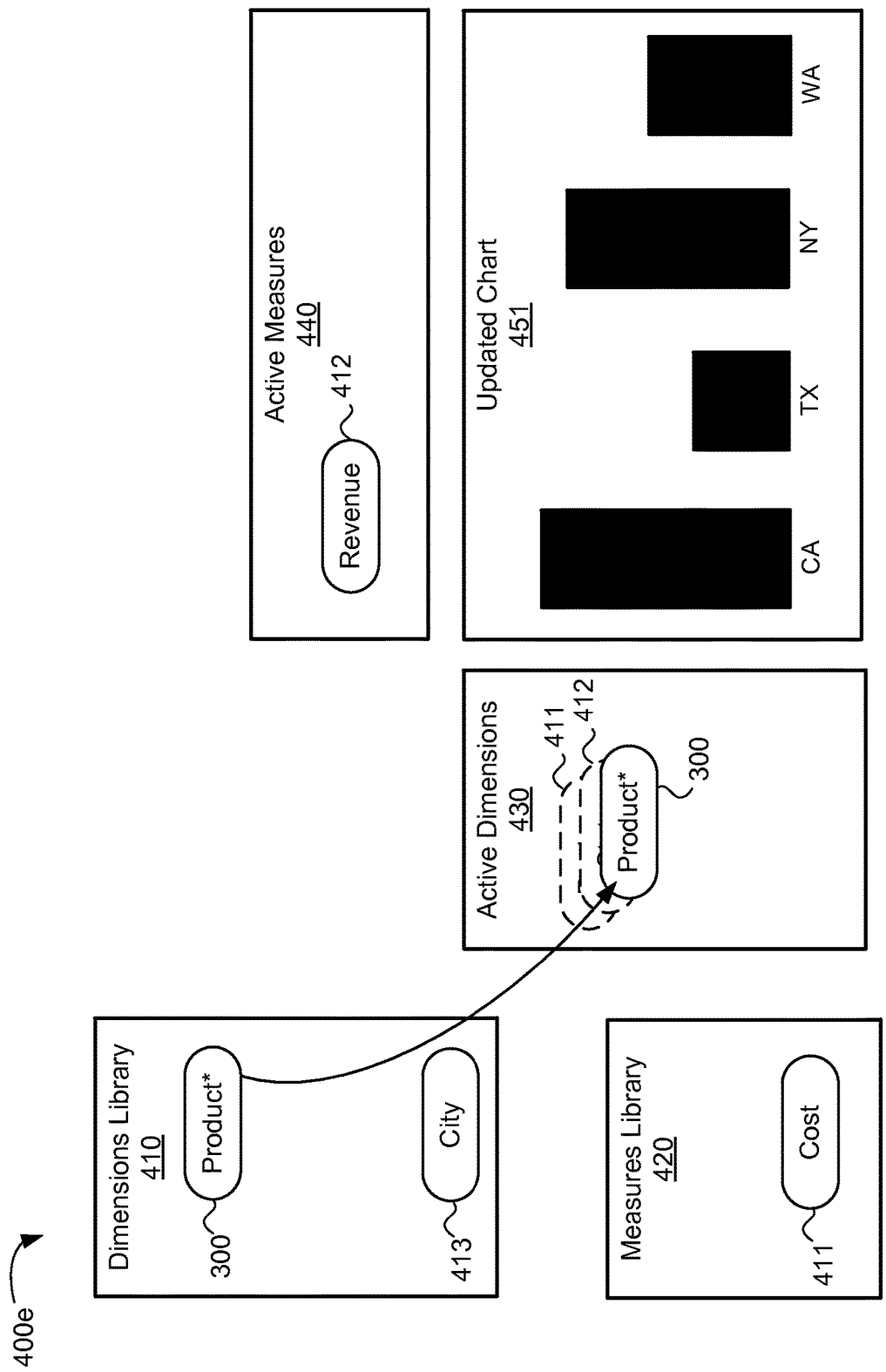

FIG. 4e illustrates another screenshot of a reporting tool according to one embodiment. In one embodiment, screenshot 400e can be captured after screenshot 400c in FIG. 4c. Screenshot 800 illustrates an example of a move operation where a dimension in dimensions library 410 having a predefined hierarchy is moved to a location that overlaps a dimension that is present in active dimensions 430. Reporting tool 124 may update hierarchy chart 125 in response to detecting the move operation. Furthermore, reporting tool 124 can update dimensions library 124 to remove product 300 and update active dimensions 430 to include product 300. Since no value has been selected for state 412, updated chart 451 can remain in the state level chart.

Figure 4F:
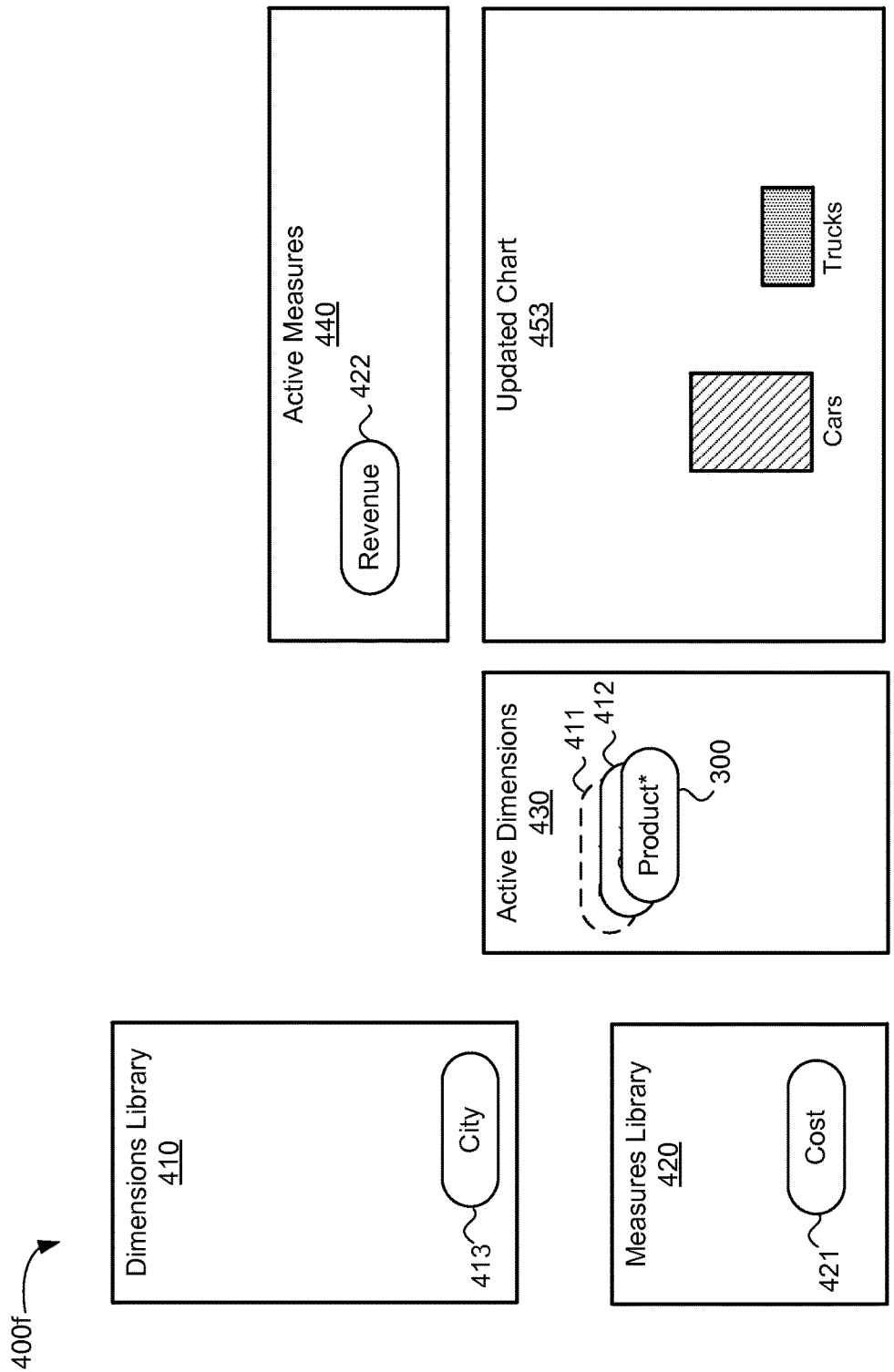

FIG. 4f illustrates another screenshot of a reporting tool according to one embodiment. In one embodiment, screenshot 400f can be captured after screenshot 400e in FIG. 4e. Screenshot 400f illustrates an example of a select operation where a chart element in updated chart 451 of FIG. 4e has been selected. In one embodiment, reporting tool 124 can detect the selection of a chart element (e.g., CA) in the state level chart and in response to the detection, generate a query to server 130 to retrieve aggregated content from the database that is related to the product dimension where the state value corresponds with the selected chart element and the region dimension is US. Reporting tool can receive the results of the query and generate updated chart 453 to illustrate the revenue generated from cars versus trucks in the selected state. Since product 300 includes a predefined hierarchy on the data model, a select operation selecting cars bar or trucks bar can result in further drill down to the predefined dimensions of product 300. An example of the hierarchy of product 300 is shown in FIG. 3. In one embodiment, reporting tool 124 can add overlapping dimensions to active dimensions 430 to identify the dimension that is currently being represented in updated chart 453 as we drill down to the dimensions based on the predefined hierarchy stored in the data model.

In one embodiment, reporting tool 124 can regenerate updated chart 453 in response to a select operation detected in active dimensions 430 or active measures 440. For example, reporting tool 124 can automatically regenerate updated chart 453 to present a chart that corresponds to state 412 when state 412 is selected in active dimensions 430. In one example, state 412 can be selected by a mouse click or tap on a portion of state 412 that is not being covered by product 300.

Figure 5:
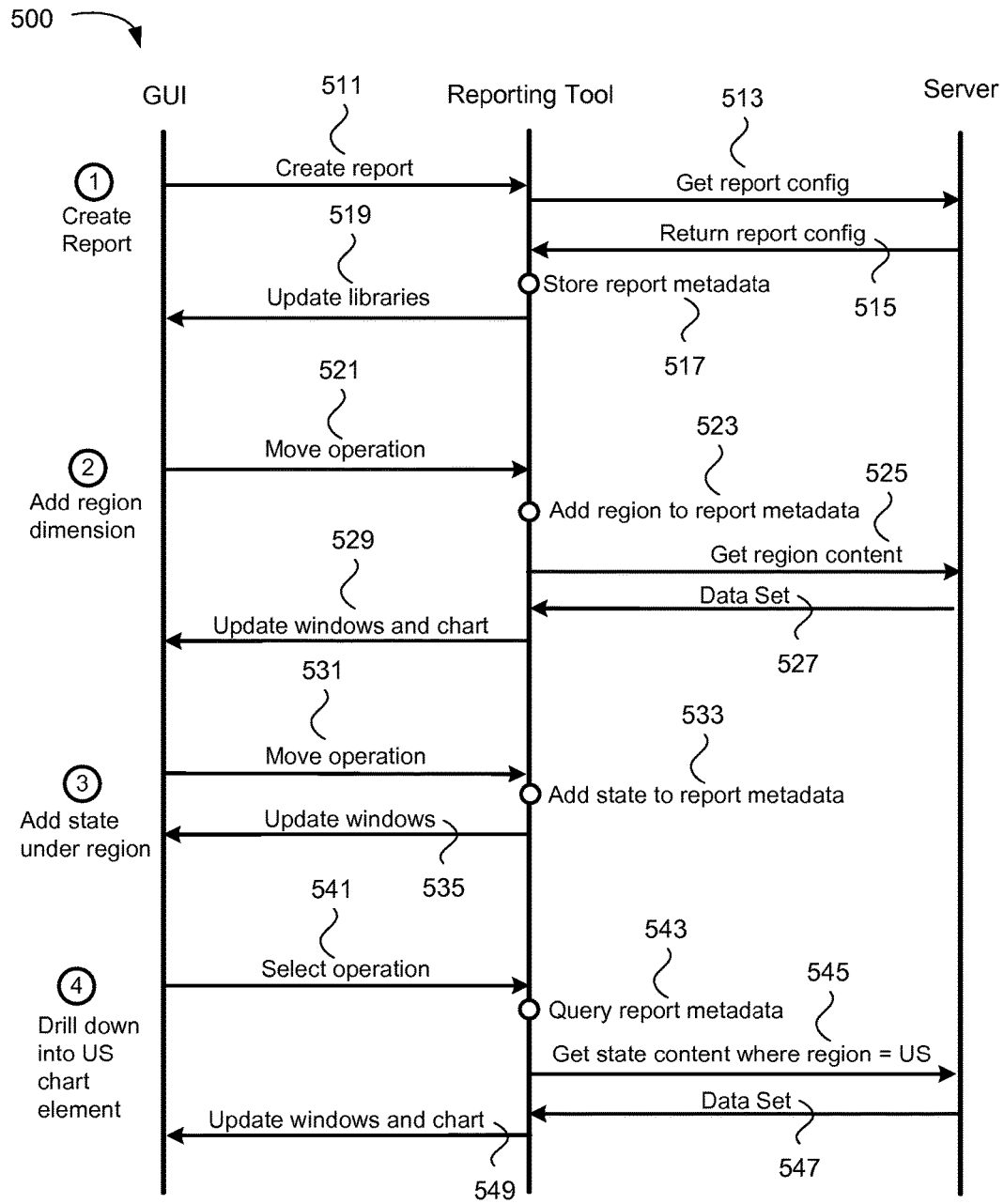
FIG. 5 illustrates a flow diagram of communications between a graphical user interface, reporting tool, and server according to one embodiment.

FIG. 5 illustrates a flow diagram of communications between a graphical user interface, reporting tool, and server according to one embodiment. Flow diagram 500 displays the communication to perform four simple tasks; creating a report, adding region dimension to the report, adding state dimension to the report, and selecting a US chart element.

To create a report, the GUI detects a create report request. The GUI transmits the create report request to the reporting tool at 511. The reporting tool can in turn transmit a request to get report configuration from the server at 513. The server processes the report configuration request and returns the report configuration at 515. The reporting tool can then store the report configuration as report metadata at 517. Storing the report configuration as report metadata can include storing the dimensions and measures available on the data model in the report metadata. Once the report configuration has been stored locally on the client, the reporting tool can transmit the report metadata to the GUI to update the dimensions library and measures library windows of the GUI at 519.

To add the region dimension, the GUI first detects a move operation. The GUI transmits the move operation to the reporting tool at 521. This can include transmitting the origin of the region dimension and the destination of the region dimension. In one example, the origin coordinates and destination coordinates for the region dimension can be transmitted to the reporting tool. The reporting tool can process the move operation and determine the dimension being moved (e.g., region dimension) plus the destination of the dimension (e.g., inside active dimensions window). The reporting tool can add the region dimension to the report metadata at 523. Once the region dimension has been added, the reporting tool can get region content from the server at 525. The server can process the request and respond with a data set at 527. The reporting tool can process the results and update the windows and chart being presented on the GUI at 529. An exemplary screenshot of the GUI as the region dimension is being added is illustrated in FIG. 4a.

To add the state dimension, the GUI first detects the move operation. The GUI transmits the move operation to reporting tool at 531. The reporting can evaluate the move operation to determine the dimension being moved (e.g., state dimension) plus the destination of the dimension (e.g., inside active dimensions window overlapping the region dimension). Reporting tool can update the report metadata at to include the moved dimension at 533. The reporting tool can then update the dimension window and measures window at 535. An exemplary screenshot of the GUI after adding the state dimension is illustrated in FIG. 4b.

To drill down into US chart element, the GUI first detects the select operation selecting the US chart element from a chart representing the region dimension. The GUI transmits the select operation to reporting tool at 541. The reporting tool determines that the select operation is on a chart element in the chart. Reporting tool can then query report metadata to determine whether the dimension corresponding to the selected chart element has a hierarchical relationship with another dimension at 543. Here, it is determined that the state dimension is the child of the region dimension in the report metadata and as a result, reporting tool queries the server to get the state content where the region is set to US at 545. The server returns the data set to the reporting tool at 547. The reporting tool then uses the data set to update the window and the chart. Updating the windows can include updating the highlighting of the active dimensions window. Updating the chart can include regenerating the chart to illustrate the state level data. An exemplary screenshot of the GUI after drilling down into the US chart element is shown in FIG. 4c.

An exemplary computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented system comprising:
   one or more computer processors; and
   a non-transitory computer-readable storage medium comprising instructions, that when executed, control the one or more computer processors of a client to be configured for:
   providing a first window configured to present a library containing variables belonging to a multidimensional data model stored in a remote server;
   providing a second window configured to present one or more variables from the library that are used in a report on the multidimensional data model, the report having report metadata stored on the client as a hierarchy table defining hierarchical relationships between the one or more variables, wherein the report metadata includes a field in the hierarchy table differentiating a hierarchical relationship as predefined in the multidimensional data model;
   detecting a move operation to move a first variable from the first window to the second window;
   updating the report metadata to include the first variable in response to detecting the move operation;
   based upon the field, querying the remote server for the hierarchical relationship predefined in the multidimensional data model;
   updating the first window to remove a different variable violating the hierarchical relationship in the report metadata;
   updating the library in the first window to display only variables which establish the hierarchical relationship within the report metadata;
   wherein the updating the report metadata, the updating the first window, and the updating the library comprises:
   transmitting, by the one or more computer processors of the client, a query to the remote database server to request aggregated database data, the query including a query expression based upon the hierarchy table; and
   receiving, by the one or more computer processors of the client, a data set from the remote database server in response to the query.

2. The computer implemented system of claim 1, wherein updating the report metadata comprises establishing a hierarchical relationship between the first variable and a second variable in the report metadata when the first variable is moved to a location in the second window that overlaps the second variable.

3. The computer implemented system of claim 2, wherein establishing the hierarchical relationship comprises:
   determining that the multidimensional data model includes a relationship between the first variable and the second variable; and
   setting the hierarchical relationship based on the relationship.

4. The computer implemented system of claim 1, the method further comprising:
   providing a chart of the report that corresponds with the second variable in a third window;
   detecting a selection of a chart element within the chart that corresponds to a value of the second variable;
   identifying the first variable as a child to the second variable based on the report metadata; and
   replacing the chart with another chart that corresponds with the first variable filtered according to the value of the second variable.

5. The computer implemented system of claim 1, the method further comprising:
   detecting a selection of the second variable in the second window; and
   providing a chart of the report that corresponds with the second variable in a third window.

6. A computer-implemented method comprising:
   providing, by a client processor, a first window configured to present a library containing variables belonging to a multidimensional data model stored in a remote server;
   providing, by the processor, a second window configured to present one or more variables from the library that are used in a report on the multidimensional data model, the report having report metadata stored on a client as a hierarchy table defining hierarchical relationships between the one or more variables, wherein the report metadata includes a field in the hierarchy table differentiating a hierarchical relationship as predefined in the multidimensional data model;
   detecting, by the client processor, a move operation to move a first variable from the first window to the second window;

updating, by the client processor, the report metadata to include the first variable in response to detecting the move operation;

based upon the field, querying the remote server for the hierarchical relationship predefined in the multidimensional data model;

updating, by the client processor, the first window to remove a different variable violating the hierarchical relationship in the report metadata;

updating, by the client processor, the library in the first window to display only variables which establish the hierarchical relationship within the report metadata;

wherein the updating the report metadata, the updating the first window, and the updating the library comprises:

transmitting, by the client processor, a query to the remote database server to request aggregated database data, the query including a query expression based upon the hierarchy table; and receiving, by the client processor, a data set from the remote database server in response to the query.

7. The computer-implemented method of claim 6, wherein updating the report metadata comprises establishing, by the processor, a hierarchical relationship between the first variable and a second variable in the report metadata when the first variable is moved to a location in the second window that overlaps the second variable.

8. The computer-implemented method of claim 7, wherein establishing the hierarchical relationship comprises:

determining, by the processor, that the multidimensional data model includes a relationship between the first variable and the second variable; and setting, by the processor, the hierarchical relationship based on the relationship.

9. The computer-implemented method of claim 6, the method further comprising:

providing, by the processor, a chart of the report that corresponds with the second variable in a third window;

detecting, by the processor, a selection of a chart element within the chart that corresponds to a value of the second variable;

identifying, by the processor, the first variable as a child to the second variable based on the report metadata; and replacing, by the processor, the chart with another chart that corresponds with the first variable filtered according to the value of the second variable.

10. The computer-implemented method of claim 6, the method further comprising:

detecting, by the processor, a selection of the second variable in the second window; and providing, by the processor, a chart of the report that corresponds with the second variable in a third window.

11. The computer-implemented method of claim 6, wherein the first variable includes a predefined hierarchy with a third variable and wherein the report metadata tracks the predefined hierarchy.

12. A non-transitory computer readable storage medium storing one or more programs, the one or more programs comprising instructions for a client processor, wherein the client processor executes the instructions to cause the client processor to perform a method comprising:

providing a first window configured to present a library containing variables belonging to a multidimensional data model stored in a remote server;

providing a second window configured to present one or more variables from the library that are used in a report on the multidimensional data model, the report having report metadata stored on a client as a hierarchy table defining hierarchical relationships between the one or more variables, wherein the report metadata includes a field in the hierarchy table differentiating a hierarchical relationship as predefined in the multidimensional data model;

detecting a move operation to move a first variable from the first window to the second window;

updating the report metadata to include the first variable in response to detecting the move operation;

based upon the field, querying the remote server for the hierarchical relationship predefined in the multidimensional data model;

updating the first window to remove a different variable violating the hierarchical relationship in the report metadata;

updating the library in the first window to display only variables which establish the hierarchical relationship within the report metadata;

wherein the updating the report metadata, the updating the first window, and the updating the library comprises:

transmitting, by the client processor, a query to the remote database server to request aggregated database data, the query including a query expression based upon the hierarchy table; and receiving, by the client processor, a data set from the remote database server in response to the query.

13. The non-transitory computer readable storage medium of claim 12, wherein updating the report metadata comprises establishing a hierarchical relationship between the first variable and a second variable in the report metadata when the first variable is moved to a location in the second window that overlaps the second variable.

14. The non-transitory computer readable storage medium of claim 13, wherein establishing the hierarchical relationship comprises:

determining that the multidimensional data model includes a relationship between the first variable and the second variable; and setting the hierarchical relationship based on the relationship.

15. The non-transitory computer readable storage medium of claim 12, the method further comprising:

providing a chart of the report that corresponds with the second variable in a third window;

detecting a selection of a chart element within the chart that corresponds to a value of the second variable;

identifying the first variable as a child to the second variable based on the report metadata; and replacing the chart with another chart that corresponds with the first variable filtered according to the value of the second variable.

16. The non-transitory computer readable storage medium of claim 12, the method further comprising:

detecting a selection of the second variable in the second window; and providing a chart of the report that corresponds with the second variable in a third window.

17. The non-transitory computer readable storage medium of claim 12, wherein the first variable includes a predefined hierarchy with a third variable and wherein the report metadata tracks the predefined hierarchy.

* * * * *